Patented Apr. 7, 1942

2,278,454

UNITED STATES PATENT OFFICE 2,278,454

MANUFACTURE OF BASIC REFRACTORIES

Harley C. Lee, Columbus, Ohio, assignor, by mesne assignments, to Basic Refractories, Incorporated, Cleveland, Ohio, a corporation of Ohio No Drawing. Application July 15, 1936, Serial No. 90,732

21 Claims. (Cl. 106—58)

With changes in metallurgical practice, and the newer types of melting procedures, including induction furnace melting, problems have arisen which have not been satisfactorily met by existent refractories; for instance there being required particular strength at high temperatures and ability to resist corrosion by metals and slags, together with sufficient resistance against thermal shock incident to rapid heating and cooling. Furthermore, in the preparation of refractories from magnesian materials, heretofore only the purer grades of magnesite have been practicable, and magnesites containing appreciable quantities of silica and lime have been un-usable. In accordance with the present invention, refractory products can be prepared however with controlled adaptation, meeting particular requirements of metallurgical practice, and at the same time raw materials can be applied which have heretofore been considered impossible of usage in the industry.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Magnesium-containing material, is, in accordance with the invention, employed, together with silica and lime components, to provide a compound silicate including associated refractory minerals whose resultant properties in a refractory product are controlled to the emphasizing of particular characteristics as may be desired in any given instance. In my application Ser. No. 759,741, I have disclosed and claimed the fundamental production of merwinite refractories. With the further operation of the principle here set forth I have found that more complex compositions may be made up wherein not only a bond is provided, which in the nature of a silicate containing calcium and magnesium, is a hydraulic bond at ordinary or low temperature, permitting particularly advantageous forming of refractory shapes, and at high temperatures affording also a crystalline high temperature bond holding a combination of refractory agents in service, especially resistant against shrinkage and spalling damage, but in general with raw materials involving magnesia, lime and silica, by provision of suitable ratios there may be developed the compound $Ca_3MgSi_2O_8$, merwinite, and by suitable proportions of lime and silica thereover, there may be produced in association and in chemical equilibrium therewith, periclase, and also calcium orthosilicate, and with controlled properties depending upon the particular proportions, affording as a result novel products and the important manufacturing advantages of being able to employ materials heretofore inapplicable in the production of refractories. If the weight ratio is within the limits, 1.4 to 1.0, and 1.8 to 1.0, merwinite and calcium orthosilicate both result. Magnesia in excess of that required for merwinite, goes into periclase. With a lime to silica ratio of about 1.4 to 1.0, the silicate formed will be predominantly merwinite with lesser amount of calcium orthosilicate, and with a lime to silica ratio of about 1.6 to 1.0, to about 1.8 to 1.0, the silicate formed will be predominantly calcium orthosilicate with lesser amounts of merwinite. With a lime to silica ratio much above 1.8 to 1.0, the silicate is almost entirely calcium orthosilicate. The high temperature form of calcium orthosilicate in equilibrium with merwinite and periclase is modified somewhat by solid solubility of magnesia and silica. In very high temperature service, the proportional amount of calcium orthosilicate may accordingly be increased somewhat on account of solid solution or incongruent solution reactions.

Quite a variety of natural materials can be employed in the process, and the detail will depend somewhat upon the precise proportions of silicate bond and periclase desired in the refractory product. Suitable sources of silica may be found in quartz, tripoli, magnesium silicates, such as serpentine, dunite, talc, magnesian clays, including sedimentary magnesites, and siliceous magnesites. For lime and magnesia, magnesite, brucite, limestone, magnesian limestone, and dolomite supply the principal source supplementing the amount of lime and magnesia present in the siliceous materials. These raw materials should preferably be relatively free from, or contain only small percentages of iron oxide and alumina. By combining available minerals, it is possible to use materials such as siliceous magnesites, brucites, and dolomites that would not otherwise be useful for high-grade refractories. The desired composition may be attained by compounding mixtures of these raw materials in such amounts as to yield CaO, MgO, and $SiO_2$, in the range of proportions above noted. The raw materials are suitably pulverized and intimately mixed or ground to a slurry, with or without the addition of small amounts of accessory fluxes, particular care being necessary in mixtures involving refractory forms of silica to insure finely ground silica. The slurry may be burned in a rotary kiln at suitable temperatures, for instance about 1500° C. or 1600° C., or the slurry may be pressed into dobies or be briquetted, and be fired in stack or periodic kilns at a somewhat lower temperature, for instance about 1400° C. or 1500° C. The fired product is then crushed and used as refractory material, or formed into refractory shapes. Under such heat treatment, chemical combination takes place producing merwinite, calcium orthosilicate, and periclase in the product, the relative amounts dependent upon the proportioning of the raw materials. The crystalline phases, periclase, calcium orthosilicate, and merwinite are easily recognizable, and distinguishable in the product by microscopic examination.

Microscopic examination of the material made by my invention discloses a holocrystalline product with no appreciable amount of fusible glass or fusible mineral present. The product is microgranular, and uniform in texture and in the distribution of the mineral present. The periclase and calcium orthosilicate occur as microscopic grains cemented together with a crystalline bond of merwinite. It is believed that the dispersion of the periclase and the calcium orthosilicate by the merwinite prevents their growth in grain size. The fine granular and compacted crystal grains produce an unusually tough and strong mass.

Magnesite refractories containing large amounts of periclase ordinarily develop a peculiarly weak structure at high temperatures. They possess low crushing strength, due ordinarily to the fact that the periclase particles are spherical in shape and are bonded with a bond which softens and offers little resistance to compression, producing a somewhat sandy character.

Calcium orthosilicate, as found in basic magnesia refractories, tend to form elongated crystals. These crystals grow in size and often enclose the periclase particles. The association of calcium orthosilicate on the other hand with merwinite in the present refractory, effectively changes the habit of the calcium orthosilicate, preventing its growth into large crystals. By keeping the crystals from growing and by maintaining the high degree of dispersion, localization of strain, due to segregation, is prevented.

As indicated, by suitable proportioning of the raw materials, merwinite, also calcium orthosilicate, and periclase may be provided in desired respective proportions in the refractory products, and in the structure so modified each bears importantly on the general result. Periclase has the highest melting temperature, and the greater the proportion thereof, the higher the total refractoriness of the product. In the old practice heretofore, refractories depending upon periclase have been bonded by quite low melting bonds. The resulting wide disparity in melting temperature of the periclase and that of the bond, has resulted in a glass-like bond which becomes liquid at low temperatures, such that those refractories deform readily at elevated temperatures. In the present products, in contrast, there is a crystalline bond, which maintains its rigidity and strength into high temperature ranges, to resist softening in service. Periclase in refractory service at high temperatures, particularly in the presence of very fusible fluxes as heretofore, has also a well known tendency to excessive shrinkage and loss of strength. In the present invention, this is obviated by provision of a crystalline form of bond which, in association with the periclase, as merwinite and/or calcium orthosilicate, so modifies the crystal-habit of periclase as to inhibit its crystal growth, and provide a product with uniform granular texture and strong structure. With regard to basicity, periclase is of course quite basic and has the ability to resist iron-rich slag. By provision of the calcium orthosilicate, particular resistance to certain basic slags is obtained, as for example basic open hearth slags. Merwinite is a somewhat more neutral refractory constituent, and thus the degree of basicity and the slag-resistant properties of the product can be controlled by proportioning the amounts of these minerals. Again, the merwinite has a notably lower thermal conductivity than the periclase, and the conductivity of the product can be appreciably lessened by decreasing the periclase content. For most general conditions of refractory service therefore, it is desirable to maintain the proportion of merwinite as high as is consistent with the refractory duties required. For higher temperature service where higher proportions of periclase and calcium orthosilicate are employed, smaller amounts of merwinite are used to prevent coalescence in refractory. Where the content of the periclase is high, it is desirable to have about 20 to 25 per cent of the silicate minerals present for a bond, including about 15 per cent of merwinite as particularly advantageous in bonding.

While not necessary in all cases, to insure complete mineralization and uniform products a small amount of a mineralizing flux or oxide such as $B_2O_3$ or $P_2O_5$ may be incorporated in the material. Combinations of borates and phosphates are effective. Chromium oxides may be used but they are somewhat less effective in promoting combination of the silica, and when used somewhat larger amounts are required. Ordinarily a fraction of a per cent of $B_2O_3$ or $P_2O_5$ is sufficient. These may be added in the form of borates such as colemanite, ulexite, rasorite, borax or boric acid, or in the form of phosphate such as calcium phosphate, rock phosphate, sodium phosphate or phosphoric acid, etc., and suitable sources of chromium oxides are sodium or potassium chromates or chromic oxides, up to about 2 per cent of these being used, or chromite up to about 5 per cent. These mineralizing fluxes are particularly effective in promoting easy and complete combination of the silica, and are particularly desirable where refractory forms of silica such as quartz or silica sand are employed. With extremely finely divided and hydrated forms of silica such as magnesian clays and sedimentary magnesites, such mineralizing agents are generally unnecessary. In those refractories containing quite large amounts of calcium orthosilicate, the fluxes give additional service in making certain the presence in the refractory of calcium orthosilicate in its high temperature form.

While these fluxes are often desirable, as indicated, in initial firing operation, any great excess impairs the final refractoriness of the product, and it is advantageous to select raw materials which either do not require such accessory fluxes, or require only a minimum, and in all events there should be used as small a quantity as will give adequate maturity in the initial operation and insure high temperature form of calcium orthosilicate, without an excess. Merwinite promotes maturity in the product. Where there are large amounts of periclase and calcium orthosilicate and smaller amounts of merwinite, it is desirable to use hydrated or finely divided forms of silica, whereas with increasing percentages of merwinite more refractory forms of silica such as silica sand and dunite can be used satisfactorily.

With the higher concentrations of merwinite, the iron oxide and alumina content of the raw materials should be carefully watched and kept low. With increasing contents of periclase and periclase and calcium orthosilicate more iron oxide may be present. Such iron oxide permits lower firing temperatures or shorter maturing times. Because of the greater ease of maturing merwinite lower firing temperatures and shorter firing cycles may be used with increasing amounts of merwinite in the refractory.

The hydraulic properties of merwinite enable it to be used to advantage as a cement for bonding refractories. It is superior to calcium orthosilicate and higher lime silicates in this respect in that less calcium hydrate is formed in the hydration of the merwinite. Merwinite hydrates very slowly and a period of a week up to several weeks is required to develop a strong bond and several months are required to develop its full strength. The rate of hydration can be increased and the early strength increased by the use of accelerators. Calcium chloride or materials which react to form calcium chloride as for instance hydrochloric acid and ammonium chloride are particularly effective in accelerating the setting of the merwinite cement, a fraction of a per cent producing remarkably strong shapes in a few days time.

Bentonites and magnesian clays are also effective in increasing the early strength of the merwinite bond. These may advantageously be used in conjunction with calcium chloride. Bentonites having low contents of alumina, iron oxide, and alkalies should be selected and the amount used should be limited to five per cent or less because of these impurities. Magnesian clays containing little alumina or iron oxide may be used to the extent of ten or fifteen per cent. The high shrinkage of bentonites and magnesian clays make the use of much larger quantities undesirable. Where appreciable percentages of these materials ar used, allowance must be made for the lime and silica in these additions to maintain the desired ratio of lime to silica in the final refractory product. These materials are advantageous in the pressing or forming operation because of their plasticity.

The merwinite for use as a cement should be finely ground and intimately mixed with the coarser refractory particles. Refractory products containing large proportions of merwinite may be finely pulverized and used advantageously as cement for bonding periclase and calcium orthosilicate refractories or refractory products consisting essentially of periclase and calcium orthosilicate, twenty to forty per cent of such cement ordinarily being used.

To develop the full strength of such cement the formed shapes should be cured for several weeks in an atmosphere of high humidity or the shapes should be moistened occasionally if cured in ordinary atmospheres. The curing should preferably be carried out at about ordinary room temperatures.

Where calcium chloride, bentonites, or magnesian clays are added shorter curing times may be used. High forming pressures likewise develop higher early strengths and permit of shorter curing times. Refractories comprising merwinite, periclase and calcium orthosilicate which have been formed at high pressure with some 40 per cent merwinite as a cement after curing for six to eight weeks in a humid atmosphere show moduli of rupture of around 1,000 pounds per squire inch or more. Such refractories have desirable spalling-resistance properties and may be applied in many types of refractory service without refiring.

As an example: With 200 parts of magnesian clay, (as from southern Nevada, and analyzing: loss on ignition 37.6, silica 19.7, alumina 1.0, iron 0.8, lime 15.3, and magnesia 25.6) there is added 110 parts of dolomite (analyzing: loss ignition 47.0, silica 0.5, $R_2O_3$ 0.1, lime 30.8, and magnesia 21.6). These materials are proportioned to maintain the lime and silica in the product in a ratio of about 1.6 to about 1.0. The magnesian material and the dolomite are each finely ground and are then thoroughly mixed to a stiff mud and formed into shapes, which are dried and fired in a periodic kiln to cone 18. The calcined shapes are hard and dense, and consist of periclase and merwinite with calcium orthosilicate. The resultant product analyzes approximately: silica 21.8, $R_2O_3$ 2.0, CaO 35.2, and MgO 41.0. Crushed and sized to about one-quarter inch, the crushed material may be used for patching the ports and hearths of furnaces, or the crushed material may be sized to pass a six mesh screen and contain about 40 per cent minus 200 mesh material. The crushed material is then mixed with water and pressed to about 5,000 pounds per square inch into refractory shapes. These, upon curing, become hard and strong, and can be used without being refired.

As another example: About 200 parts of sedimentary magnesite (as from southern California, analyzing: ignition loss 47.0, silica 7.1, iron 1.0, alumina 1.1, CaO 1.8, and MgO 42.0) and 33 parts of limestone (analyzing: ignition loss 43.7, silica 0.6, $R_2O_3$ 0.2, CaO 55.0, and MgO 0.5) are employed, the limestone being proportioned to give about 1.5 parts of CaO for each part of $SiO_2$ in the product. The materials are ground together with water in the form of a slurry. The slurry is dried, and the dried slurry tempered with water and pressed into bricks which are fired in a periodic kiln to cone 20. The resulting brick are hard and dense. These are crushed to about one-fourth inch, and the crushed product can be used as a patching material for ports and hearths of furnaces, or the crushed material can be sized to pass about an eight mesh screen and to contain about one-third of extremely fine material. The crushed product then can be tempered with water, pressed into bricks, which may be cured and used without refiring, or they may be refired at a temperature preferably of about cone 17. The refractory product analyzes approximately as follows: $SiO_2$ 11.6, $R_2O_3$ 3.4, CaO 17.4, and MgO 67.6.

As another example: About 100 parts of sedimentary magnesite (as from southern Nevada, analyzing: ignition loss 44.1, silica 12.1, iron 0.8, alumina 1.0, CaO 6.8, and MgO 35.2), and 50 parts of dolomite (analyzing $SiO_2$ 0.2, $R_2O_3$ 0.1, CaO 30.4, and MgO 21.8) are employed, maintaining the lime to silica in a ratio of about 1.8 to 1.0 in the product. The materials are ground together, mixed thoroughly with water and formed into shapes which are dried and fired in cone 18. The calcined shapes are hard and dense and analyze: $SiO_2$ 14.9, $R_2O_3$ 2.2, $CaO$ 26.8, and $MgO$ 56.1. These shapes may be crushed and used as such and further worked up or be made into bricks as indicated above.

As another example: 200 parts of dolomite, and 100 parts of serpentine (analyzing: silica 37.6, iron oxide 7.8, alumina 2.2, lime 0.2, and $MgO$ 35.6), are employed, maintaining about 1.6 parts of lime to each part of silica in the product. 1 part of colemanite is added, and the mixture is finely ground to a slurry, which is passed through a rotary kiln at a temperature of about 1600° C. The resulting clinker is hard and dense, slightly brownish in color, and analyzes approximately: $SiO_2$ 20.4, $Fe_2O_3$ 4.3, $Al_2O_3$ 1.1, $CaO$ 32.6, and $MgO$ 41.6. This is crushed to about four mesh, with about 40 per cent of fines, and is tempered with water and pressed into bricks at a pressure of about 4,000 pounds per square inch. The bricks, after curing damp for a week or more, are ready for use, or they may be dried and fired in a periodic kiln at cone 16.

As another example: With 100 parts of limestone, containing $CaO$ 55 and $SiO_2$ 0.6 per cent, there is incorporated 80 parts of serpentine, the same as above, and 1 part of ulexite. The lime and silica are proportioned in the ratio of about 1.8 to about 1.0. The materials are ground to a slurry with water and the slurry is fired in a rotary kiln. The resulting clinker is crushed in a dry pan to pass about an eight mesh screen, and is tempered with water and pressed at about 5,000 pounds per square inch or more into brick, which are cured, dried, and fired at cone 16. The bricks analyze approximately: $SiO_2$ 25.0, $Fe_2O_3$ 5.0, $Al_2O_3$ 1.4, $CaO$ 45.0, and $MgO$ 23.6

As another example: With 100 parts of dolomite there are incorporated 20 parts of fine silica sand, and 1 part of rasorite, the silica being proportioned with the dolomite to give a ratio of about 1.5 to 1 of silica. The mixture is finely ground as a slurry, care being taken that the hard silica is ground to approximately 200 mesh sizes in the presence of the soft dolomite. The mixture is fired in a rotary kiln to a temperature of about 1600° C. The rasorite serves as a mineralizer. Where sodium borates are used, part of the sodium and boron oxide may volatilize out in the firing operation, but this is not undesirable, in that excess flux after performing its function is removed from the product. The resulting clinker analyzes: $SiO_2$ 27.9, $R_2O_3$ 0.3, $CaO$ 42.2, and $MgO$ 29.6. The clinker contains a large proportion of merwinite with accessory amounts of calcium orthosilicate and periclase. A novel refractory can be made from this product by crushing to about minus six mesh and producing material substantially passing a six mesh screen and containing about 50 per cent minus 100 mesh material. This mixture is tempered with water, pressed at a pressure of 10,000 pounds per square inch, forming brick, which are cured in a moist or wet condition for a week or preferably longer. The merwinite content here particularly exercises an action as hydraulic bond, and the resulting brick after curing have a modulus of rupture of from 500 to in excess of 1,000 pounds per square inch. The strength can be increased and the curing time shortened by tempering the crushed clinker with a dilute solution of calcium chloride. A clinker of this composition is notably adaptable for bonding other materials or clinkers made according to other of the examples herein given. For this purpose, the clinker is desirably ground to the fineness of Portland cement, and 15 to 40 per cent of this fine material is incorporated with the particles of the other clinkers.

As another example: With 200 parts of a siliceous magnesite (as from northern California, analyzing: ignition loss 42.2, $SiO_2$ 9.8, $Fe_2O_3$ 2.0, $Al_2O_3$ 1.4, $CaO$ 1.4, and $MgO$ 43.2), there is incorporated 53 parts of limestone containing 55 per cent $CaO$, 0.6 per cent $SiO_2$, and 0.2 per cent $R_2O_3$, the materials being proportioned to give a lime to silica ratio of about 1.6 to 1.0. The mixture is then intimately finely ground dry, and to the mixture is added a solution of boric acid in proportion to give about 0.5 per cent of boric acid per 100 parts of raw material. This is pressed, moist, into briquettes, which are fired in a periodic kiln to a temperature of about cone 18. The briquettes analyze approximately: $SiO_2$ 13.7, $R_2O_3$ 4.7, $CaO$ 21.9, and $MgO$ 59.7. The briquettes crushed to about one-fourth inch or finer, can be used for hearth repairs, or may be crushed to give a coarse and fine material. The coarse material is sized to pass about a six mesh screen and the fine material is sized to about a 100 mesh screen. These coarse and fine materials are combined in the proportion of 45 to 65 per cent of coarse material and about 35 to 55 per cent of fine material. The mixture, for example 60 per cent coarse material and 40 per cent fine material, is tempered with water, and pressed into bricks at a pressure of 8,000 pounds or more per square inch. The bricks are cured for a few days, dried and fired in a periodic kiln at cone 18. Alternatively, the coarse clinkers may be bonded by the fine material from the example immediately above. Thus, 70 parts of the coarse clinker are crushed to about an eight mesh screen, and containing about 10 per cent of minus 65 mesh material, and about 30 per cent of the finely ground product according to the example immediately above, are mixed, and the resulting product is tempered with a 2 per cent solution of calcium chloride, and pressed into bricks at a pressure of about 10,000 pounds or more per square inch. The bricks are dried slowly at an ordinary low temperature for a few days, to develop the hydraulic bond of the merwinite without hydrating the periclase. The resulting bricks are strong, and can be directly laid up in walls or the like to be later fired in place.

As another example: With 100 parts of dolomite containing 0.5 per cent $SiO_2$, 30.8 per cent $CaO$, and 21.6 per cent $MgO$, there is added 44 parts of dunite, containing 40.5 per cent $SiO_2$, 8.0 per cent $Fe_2O_3$, 2.0 per cent $Al_2O_3$, 0.1 per cent $CaO$, and 46.5 per cent $MgO$, the proportioning being such as to give 1.7 parts of lime to 1.0 parts of silica in the product. 1 part of rasorite and one-half part of rock phosphate are added, and the mixture is finely ground as a slurry, which is fired in a rotary kiln, the kiln being rather slowly rotated to insure thorough combination and maturity in the product. The clinker analyzes approximately $SiO_2$ 19.2, $R_2O_3$ 4.7, $CaO$ 32.2, and $MgO$ 43.8. The clinker is crushed in a dry pan to pass a six mesh screen, and is tempered with water and pressed into bricks which are fired in a periodic kiln at about cone 17.

As another example: With 100 parts of brucite which contains some serpentine and dolomite and analyzing: ignition loss 31.5, $SiO_2$ 4.5, $R_2O_3$ 1.4, CaO 4.4, and MgO 58.2, there is added 9 parts of additional dolomite to give a ratio of lime to silica 1.5 to 1.0 in the product. The mixture, together with one-half of 1 per cent of colemanite, is ground dry, and is moistened and pressed into briquettes, which are fired at about cone 18. The product analyzes approximately: $SiO_2$ 6.2, $R_2O_3$ 2.0, CaO 9.3, and MgO 82.5. The briquettes are crushed and pressed into bricks which are refired at about cone 16.

As another example: With 200 parts of limestone containing 0.6 per cent $SiO_2$, 55.0 CaO, and 0.5 MgO, there is incorporated 110 parts of talc, containing $SiO_2$ 61.1, MgO 31.8, $R_2O_3$ 1.2, and CaO 0.1. These are combined from analysis to give 1.6 parts of lime to 1.0 of silica. The mixture is intimately ground as a slurry with 1 part of colemanite and one-half part of calcium superphosphate. The slurry is fired in a rotary kiln at a temperature of about 2900° F. The clinker analyzes approximately: $SiO_2$ 31.6, $R_2O_3$ 0.8, CaO 50.9, and MgO 16.6. The clinker is crushed in a dry pan to about four mesh and containing about 30 per cent of fine material. The mixture is tempered with water and pressed into bricks, which can be cured and used as such, or may be refired to cone 15. These bricks are strong and are very serviceable where refractories are subject to abrasion and have to withstand heavy loads.

As another example: With 200 parts of magnesite (as from southern Nevada, analyzing: ignition loss 43.9, $SiO_2$ 11.4, $R_2O_3$ 1.4, CaO 6.3, and MgO 39.0), there is added 52 parts of limestone containing 55 per cent CaO, and 0.6 per cent $SiO_2$, to give from the analysis about 1.8 parts of lime to 1.0 of silica. The limestone and magnesite are ground intimately, along with 5 parts of chromite, and a stiff mud is formed. From this, bricks are made, and after drying are fired in a shaft kiln at a temperature of about 2800° F. The bricks analyze approximately: $SiO_2$ 15.8, $R_2O_3$ 5.0, CaO 28.1, and MgO 51.1. These may then be crushed to pass about a six mesh sieve and to contain about 30 per cent of fine material, and the crushed mixture is tempered with water and pressed into bricks which are then fired at cone 18.

Other modes of applying the principle of the invention may be employed, change being made as regards the details described, provided the features stated in any of the following claims, or the equivalent of such, be employed.

I therefore particularly point out and distinctly claim as my invention:

1. A process of making refractories, which comprises heating materials containing magnesia and lime and silica to silicate formation including calcium orthosilicate and merwinite providing a hydraulic low-temperature bond and a crystalline high-temperature bond with periclase.

2. A process of making refractories, which comprises heating materials containing magnesia and at least six per cent of silica and lime in proportions for the formation of merwinite and calcium orthosilicate and periclase.

3. A process of making refractories, which comprises heating materials containing magnesia and at least six per cent of silica and lime in proportions for the formation of at least twenty per cent merwinite and calcium orthosilicate bonding periclase.

4. A process of making refractories, which comprises heating materials containing magnesia and lime and at least six per cent of silica in proportions for the formation of periclase and calcium orthosilicate and augmenting the strength of the periclase by provision of a bonding silicate including merwinite.

5. A process of making refractories, which comprises heating material containing magnesia and lime and silica, in which the lime and silica are in the weight ratio of 1.4/1.0 in proportions for 1.8/1.0, to the formation of a product including merwinite and calcium orthosilicate.

6. A process of making refractories, which comprises heating materials including a hydrated magnesian silicate and a source of lime, in proportions for the formation of a product including merwinite and calcium orthosilicate.

7. A process of making refractories, which comprises heating materials including magnesia and a clay and a source of lime, in proportions for the formation of a product including merwinite and calcium orthosilicate.

8. A process of making refractories, which comprises heating material containing magnesia and lime and silica, in which the lime and silica are in the weight ratio of 1.8/1.0, in proportions for the formation of a product including merwinite and calcium orthosilicate and periclase.

9. A process of making refractories, which comprises heating materials including a magnesian clay and a source of lime, in proportions for the formation of a product including merwinite and calcium orthosilicate and periclase.

10. A process of making refractories, which comprises heating material containing magnesia and lime and silica, in which the lime and silica are in the weight ratio of 1.4/1.0 to 1.8/1.0, in proportions for the formation of a product including merwinite and calcium orthosilicate, grinding, and mixing with water for a cementing bond.

11. A process of making refractories, which comprises heating material containing magnesia and lime and silica, in which the lime and silica are in the weight ratio of 1.8/1.0, together with a mineralizing flux, in proportions for the formation of a product including merwinite, and calcium orthosilicate and periclase.

12. A process of making refractories, which comprises heating materials containing magnesia and lime and silica in proportions for the provision of merwinite and calcium orthosilicate, grinding the product, mixing with water to utilize the hydraulic bonding property, pressing into shapes, and curing in the presence of moisture.

13. A process of making refractories, which comprises heating materials containing magnesia and lime and silica in proportions for the provision of merwinite and calcium orthosilicate, grinding, reproportioning as about 40–65 per cent of coarse particles and about 35–55 per cent of fine material, mixing with water, and pressing into shapes.

14. A process of making refractories, which comprises heating materials containing magnesia and lime and silica in proportions for the provision of merwinite and calcium orthosilicate, grinding, mixing with a dilute solution of an agent providing calcium chloride, and pressing into shapes.

15. A process of making refractories, which comprises heating materials containing magnesia and lime and silica in proportions for the provision of merwinite and calcium orthosilicate, grinding, including a small amount of a magnesian clay, and pressing into shapes.

16. A refractory of holocrystalline microscopic structure including merwinite and calcium orthosilicate and periclase.

17. A refractory comprising the reaction products of magnesia and lime and silica in which the lime and at least six per cent of silica are in the weight ratio of 1.4/1.0 to 1.8/1.0, thereby providing periclase and calcium orthosilicate and merwinite.

18. A refractory comprising periclase and calcium orthosilicate modified in crystal habit by merwinite.

19. A cement suitable for refractory usage, comprising the reaction products of magnesia and lime and at least six per cent of silica, in which the lime and silica are in the weight ratio of 1.4/1.0 to 1.8/1.0, thereby providing periclase and calcium orthosilicate and merwinite.

20. A refractory comprising periclase in a silicate structure substantially free from interstitial fusible glass and embodying merwinite and calcium orthosilicate.

21. A refractory of periclase substantially free from interstitial fusible glass and embodying at least twenty per cent of silicates and including merwinite and calcium orthosilicate.

HARLEY C. LEE.